United States Patent [19]

Gallucci et al.

[11] Patent Number: 4,869,963
[45] Date of Patent: Sep. 26, 1989

[54] MULTILAYER COMPOSITE OF AN ETHYLENE-VINYL ALCOHOL POLYMER TIED TO A THERMOPLASTIC POLYMER

[75] Inventors: Robert R. Gallucci, Mt. Vernon, Ind.; Dana C. Bookbinder, Pittsfield, Mass.

[73] Assignee: General Electric Company, Mt. Vernon, Ind.

[21] Appl. No.: 75,716

[22] Filed: Jul. 20, 1987

[51] Int. Cl.$^4$ ............................................. B32B 27/36
[52] U.S. Cl. .................................. 428/412; 428/419; 428/424.8; 428/473.5; 428/476.3; 428/483; 428/516; 428/517; 428/518; 428/519; 264/176.1; 525/285
[58] Field of Search ................... 428/412, 419, 424.8, 428/473.5, 476.3, 483, 517, 516, 518, 519

[56] References Cited

U.S. PATENT DOCUMENTS

| 733,077 | 5/1985 | Giles et al. |
|---|---|---|
| 3,748,218 | 7/1973 | Newman, Jr. et al. |
| 4,332,858 | 6/1982 | Saitoh et al. ............ 428/517 X |
| 4,576,842 | 3/1986 | Hartsing et al. ............ 428/473.5 |

FOREIGN PATENT DOCUMENTS 085115 8/1982 European Pat. Off.

*Primary Examiner*—P. C. Ives
*Attorney, Agent, or Firm*—Martin B. Barancik

[57] ABSTRACT

A multilayer composite which comprises a layer of an ethylene vinylalcohol polymer tied to a thermoplastic polymer with a hydrogenated alkadiene vinyl aromatic block copolymer which is graft modified with an unsaturated acid anhydride or unsaturated dicarboxylic acid thereof.

11 Claims, No Drawings

MULTILAYER COMPOSITE OF AN ETHYLENE-VINYL ALCOHOL POLYMER TIED TO A THERMOPLASTIC POLYMER

BACKGROUND OF THE INVENTION

Multilayer compositions have been useful for many years. The concept of a multilayer is that the positive properties of two or more materials are combined with the structural integrity of each material being essentially uncompromised. Usually the positive properties of one material offset or counterbalance the weaker properties of the second material. For example among the positive properties of polycarbonate are high heat resistance and impact strength. However, polycarbonate has a relatively high transmission rate for certain gases, oxygen and carbon dioxide, for example. Ethylene vinyl alcohol copolymer does not have very high resistance to impact or heat but has excellent resistance to the transmission of various vapors and fluids such as oxygen and carbon dioxide. Therefore a multilayer composition utilizing polycarbonate adjacent to ethylene vinyl alcohol can be employed in structures wherein the properties of high impact resistance, high heat resistance and high resistance to oxygen and carbon dioxide transmission are necessary.

Although many of these multilayer compositions can be hypothesized on the basis of laminating a material possessing certain strong properties with a material having weaknesses in these same property areas, certain practical considerations inhibit successful implementation on this theory. The two materials are in intimate contact at their interface. This juncture of interface should provide a sufficiently strong interaction with respect to the processing conditions which the multilayer structure undergoes that a tight, firm bond is maintained. Such conditions to which the multilayer can be exposed include heat, pressure, humidity, liquid chemicals, gases, and the like or various combinations of these conditions. The propensity of the two layers to maintain this tight, firm bond is generally known as the "compatibility" of the two layers. When the two materials are incompatible the utility of the multilayer structure is severely inhibited or useless. In order to bind two relatively incompatible layers, a tie layer is generally employed joining the two incompatible layers by "tieing" them together. This tie layer usually enjoys good compatibility with both incompatible layers and is a layer between the two incompatible layers.

The aforementioned multilayer combination of polycarbonate and ethylene vinyl alcohol suffers from this incompatibility. In fact, ethylene vinyl alcohol is compatible in a multilayer situation with very few other thermoplastics. Its peel strength, that is the amount of force needed to peel apart the ethylene vinyl alcohol layer from the layer in which it is intimate contact is extremely low, thereby providing an extremely weak multilayer composite.

Various solutions have been directed to effectively combining ethylene vinyl alcohol polymers with other thermoplastic layers. Specifically, U.S. Pat. No. 4,332,858 issued to Saitoh, et al and assigned to Asahi Kasei Kogyo Kabushik Kaisha specifically deals with the problem of compatibilizing ethylene vinyl alcohol polymers with other thermoplastic polymers so as to provide strong interlaminar adhesion, i.e. peeling strength. The solution which is disclosed in the Saitoh '858 patent is the use of a specific tie layer prepared from a block copolymer of a polymerized alkyldiene and a vinyl aromatic. Block copolymers of butadiene and styrene are disclosed and employed. The interlaminar adhesion of the system is substantially increased by the use of a graft modified butadienestyrene block copolymer. The graft modifying agent is an unsaturated dicarboxylic acid or dicarboxylic acid anhydride. These agents include such materials as maleic acid, fumaric acid, itaconic acid, and the anhydrides thereof, specifically maleic anhydride. However, even with the grafting agent on the random block copolymer, only polybutadiene can be employed as the alkyldiene substituent. According to Saitoh, isoprene cannot be employed.

However, the Saitoh invention does not provide sufficient thermal stability for the use of that tie material with high temperature thermoplastic materials in multilayer laminates with ethylene vinyl alcohol in a commercial fashion, for example by coextrusion.

It has now been discovered that a further modification of the styrene-butadiene type block copolymer together with the grafting agent of the unsaturated dicarboxylic acid or dicarboxylic acid anhydride will bring about a system which can undergo successful commercial exploitation. Additionally the butadiene unit present in the block copolymer can now be expanded to include isoprene or virtually any alkyldiene unit which can be copolymerized with a vinyl aromatic.

SUMMARY OF THE INVENTION

In accordance with the invention there is a multilayer composite which comprises at least one layer of an ethylene vinyl alcohol copolymer which is tied to a high temperature thermoplastic polymer with a hydrogenated alkadiene vinyl aromatic block copolymer which is graft modified with an unsaturated dicarboxylic acid or unsaturated dicarboxylic acid anhydride.

When utilizing this invention, multilayer composites having the three or more layers of the invention can be commercially run without fear of degradation at high temperatures. Significant interlaminar strength as shown by the high peeling values are obtained using this system. Even the utility of the block copolymer has been extended beyond that of only butadiene as the alkadiene to that of alkadiene which can be copolymerized with a vinyl aromatic. The method of preparation of the grafted block copolymer does not require the presence of a double bond in the monomer and indeed the graft agent does not react with a double bond.

DETAILED DESCRIPTION OF THE INVENTION

The ethylene vinyl alcohol copolymers which are useful as the barrier layer in the composite multilayers of this invention are well known and are commercially available from Asahi Kasei Kogyo Kabushiki Kaisha. The ethylene vinyl alcohol copolymer is readily prepared from the well known ethylene vinyl acetate copolymers by hydrolysis. Generally in order to be a good barrier resin with respect to the passage of various gases such as oxygen, carbon dioxide. nitrogen and helium. The ethylene vinyl alcohol copolymer should have from about 10 to about 60 mol % percent ethylene, preferably about 20 to 50 % ethylene. It is preferred that there be very little or no vinyl acetate left after the hydrolysis, i.e. that all the vinyl acetate should be converted to the vinyl alcohol. Generally, however, no more than about 5 weight percent of vinyl acetate will still provide a barrier resin with good properties.

The layer which provides excellent binding to the ethylene vinyl alcohol copolymer is comprised of an unsaturated dicarboxylic acid or acid anhydride molecule which is grafted onto a block copolymer of a vinyl aromatic and an aliphatic diene which has been hydrogenated to remove a substantial quantity of the residual aliphatic unsaturation present after copolymerization.

The block copolymers of the tie layer re of the linear, sequential or radial teleblock composition, are well known in the art, and are generally commercially available or may be readily prepared by known methods.

One of the blocks of these polymers comprise homopolymers or copolymers prepared from vinylaromatic hydrocarbons wherein the aromatic moiety can be either monocyclic or polycyclic. Typical monomers include styrene, alpha-methyl styrene, p-methyl styreme. vinyl xylene, ethyl vinyl xylene, vinyl naphthylene, and the like, or mixtures thereof. Assuming more than one block of vinylaromatic the blocks may be the same or different. They are preferably selected from styrene, alpha-methyl styrene, vinyl toluene, vinyl xylene, vinyl naphthylene, and especially styrene The block of aliphatic diene may be derived from, for example, butadiene, isoprene, 1,3-pentadiene, 2,3-dimethylbutadiene and the like, and it may have a linear, sequential or teleradial structure. As generally prepared, the aliphatic diene block of the polymer will have residual unsaturation present. Examples of such commercially available polymers are the KR03 series available from Phillips, Stereon 840A available from Firestone and Kraton D available from Shell Chemical. For purposes of this invention, essentially all this residual unsaturation can undergo selective hydrogenation procedures whereby essentially all the unsaturation in the vinylaromatic block(s) is maintained. The selectively hydrogenated linear block copolymers are described in Haefel, et al., U.S. Pat. No. 3,333,024 which is incorporated herein by reference. These selectively hydrogenated copolymers are commercially available from Shell as the Kraton G series such as Kraton G1650, Kraton G1651 and Kraton G1652.

The copolymers can be random blocks, diblock, or triblock. An example of a commercially available random block is Stereon 840A, a copolymer of stryrene and butadiene. An example of a diblock copolymer is Solprene, available from Phillips, a diblock of styrene and butadiene. Examples of triblock copolymer, such as styrene-butadiene-styrene are the Phillips KR03 line and the Shell Kraton G and Kraton D lines, wherein the residual unsaturation of the aliphatic diene has been essentially removed by selective hydrogenation in the Kraton G series.

The ratio of the copolymers in the triblock copolymer and the average molecular weights can vary broadly in the triblock copolymer, although the molecular weight of the aliphatic diene block should be greater than that of the combined terminal blocks. It is preferred to form the terminal block each having a weight average molecular weight of about 2,000 to about 60,000 and center block, e.g. a hydrogenated or (non-hydrogenated polybutadiene) block, with a weight average molecular weight of about 20,000 to 450,000. Still more preferably, the terminal blocks each have a weight average molecular weight of about 7,000 to about 35,000 while the hydrogenated (or non-hydrogenated polybutadiene) polymer blocks have a weight average molecular weight between about 30,000 and 150,000. The terminal blocks will preferably comprise from about 10 to about 45% by weight, more preferably from about 14 to about 40% by weight of the total block copolymer. The preferred copolymers will be those having a polybutadiene center block wherein from about 35 to about 55% of the butadiene block segment is the structure resulting from 1,2 addition.

The hydrogenated copolymer will have the average aliphatic unsaturation reduced to less than 20% of the original value. It is preferred to have the unsaturation reduced to 10%, or less, preferably 5%, or less, of its original value. After hydrogenation center blocks derived from butadiene will have the ethylene butylene structure.

The block copolymers are formed by techniques well known to those skilled in the art. Hydrogenation may be conducted utilizing a variety of known hydrogenation catalysts such as nickel on kieselghur, Raney nickel, copper chromate, molybdenum sulfide and finely divided platinum or other noble metals on a high surface area carrier.

Hydrogenation may be conducted at any desired temperature or pressure, e.g., from atmospheric to about 210 Kg/Cm$^2$. The usual range being between 7 and 70 Kg/cm$^2$ at temperatures from 24° C. to 316° C. for times between 0.1 and 24 hours, preferably from 0.2 to 8 hours.

Hydrogenated block copolymers such as Kraton G-1650, Kraton G-1651 and Kraton G-1652 from Shell Chemical Company, Polymers Division, have been found useful in the present invention. Also useful are the Solprenes of Phillips.

The hydrogenated versions of radial teleblock copolymers of which the Solprenes are typical examples can be characterized as having at least three polymer branches with each branch of the radial block polymer comprising terminal non- elastomeric segments, as defined hereinafore. The branches of the radial block polymer contain a terminal non-elastomeric segment attached to an elastomeric polymer segment, as defined hereinafore. These are described in Marrs, U.S. Pat. No. 3 735,936 and in Zelinski, U.S. Pat. No. 3,281,383, both of which are incorporated herein by reference, and they are selectively hydrogenated by well known procedures. In any event, the term "selective hydrogenation" is used herein to contemplate polymers in which the aromatic blocks have been left essentially unhydrogenated.

The molecular weight of the triblock copolymer should be selected so that the tie layer will be easily processed together with the polycarbonate and the polyolefins. Kraton G-1652 is therefore preferred over Kraton G-1651, both available from Shell since the higher molecular weight of 1651 makes it more difficult to extrude.

A hydrogenated version of a diblock copolymer such as Stereon 840A or Kraton D 1720 can also be employed in the invention. Generally the vinylaromatic portion is from about 20 to 40 weight percent of the polymer, the remainder of the polymeric unit being the aliphatic diene. The random block copolymer such as Stereon 840A is made up of various unit blocks of varying length. Although referred to generally as a random block copolymer, Stereon 840A may be tapered as well, that is a block of styrene followed by a block of butadiene followed by a shorter block of styrene than the first block which is followed by a shorter block of butadiene than the first block followed by a still shorter block of styrene, etc. The quantity of vinylaromatic such as styrene is generally from about 20 to about 50 weight percent. In Stereon 840A, the weight percent of styrene is 43%.

After preparation of the hydrogenated block copolymer of the vinyl aromatic and aliphatic diene, the unsaturated-dicarboxylic acid or acid anhydride is then grafted onto the hydrogenated block copolymer. No aliphatic double bond is needed to permit the grafting to occur. Rather the grafting occurs on the saturated aliphatic portion. The techniques disclosed in European Patent application publication No. 173380 Galles et al, assigned to Shell Internationale Research Maatschappij B. B., prepare the grafted block copolymer. Specifically the synthetic procedure as illustrated at 173380, page 6, line 23 and page 9, line 30 to page 13, line 31 are all incorporated by reference. This type of reaction will result in the addition of the unsaturated dicarboxylic acid or acid anhydride at a secondary or tertiary carbon atom of the block copolymer therefore resulting in the loss of the unsaturation in the grafting agent.

The grafting agent as previously mentioned is an unsaturated dicarboxylic acid or acid anhydride. Generally these acids or acid anhydrides are of the group consisting of

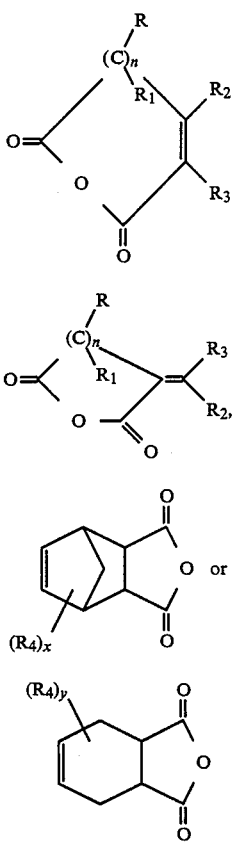

or the dicarboxylic acid analogues thereof
wherein R is the same or different as $R_1$ and is alkyl of one to six carbon atoms, inclusive, or hydrogen;
$R_2$ and $R_3$ are the same or different and are hydrogen, alkyl of one to six carbon atoms, inclusive, phenyl, chloro or bromo; and n is 0, 1 or 2.

$R_4$=H, alkyl of one to six carbon atoms, aryl, alkyl, phenyl, Br, Cl, X=0 to 7, preferably 0, 1 or 2, y=0,6,6.

The preferred alkyl groups have no more than three carbon atoms. R and $R_1$ are each preferably hydrogen and n is preferably zero or 1, x and y are preferably 0 or 1. Examples of the acid anhydrides and the diacid analogue thereof, maleic anhydride, itaconic anhydride, methyl maleic anhydride, monochloro maleic anhydride, dichloro maleic anhydride, dimethyl maleic anhydride, norbornene dicarboxylic anhydride, tetrahydrophthalic anhydride.

This particular grafted block copolymer provides an extremely strong interlaminar adhesion to the ethylene vinyl alcohol copolymer. In addition, this polymer system also provides extremely strong interlaminar adhesion to a host of other thermoplastic materials. Thereby an unusual number of strong interlaminar adhesion multilayer composites can be built up utilizing the ethylene vinyl alcohol graft modified ethylene vinyl alcohol layer, graft modified block copolymer layer as an integral grouping of layers in the laminar composite. For example, numerous well known thermoplastics can be readily adhered to the graft modified block coplymer Examples of these thermoplastics include polyolefins polyamides, polyacrylates, polyethers, polycarbonates, polyurethanes, vinylidene chlorides, polyimides, polyetherimides, polysulfides, polysulfones, polyethersulfones and virtually any other thermoplastic material. Since the ethylene vinyl alcohol copolymer is an extremely fine barrier resin, a new method of creating multilayer laminates with unusually strong adhesion and which possess the barrier qualities necessary for various packaging it is now present as well as the multilayer composites themselves. U.S.Pat. No. 4,332,858, Saitoh, previously mentioned, is incorporated by reference and discloses at column 4, line 49, through column 5, line 23 some of the various thermoplastic polymers previously mentioned. Additionally U.S.P. 4,576,842, Hartsing, et al, assigned to Union Carbide Corporation. discloses numerous additional thermoplastic resins including polyarylethersulfones, polyarylates, polyesters, styrene resins, polyhydroxyether resins, polyarylenesulfide resins which are amply disclosed at column 3, line 15 to column 26, line 10, the entire patent incorporated by reference.

Of all the aforementioned resins, the preferred resins include the polycarbonates, polyetherimides, and polyesters.

Utilizing these resins it is possible to obtain numerous structures including the tri multilayer structure of thermoplastic resin/grafted block copolymer/ethylenevinyl alcohol copolymer. Several preferred multilayer composites include the polycarbonate/grafted block copolymer/ethylenevinyl alcohol and the polyolefin/grafted block copolymer/ethylenevinyl alcohol. For those composites having even increasing multilayers, the preferred multilayer composite includes the five layer composite of polycarbonate/grafted block copolymer/ethylene vinylalcohol/grafted block copolymer/polymer/ethylene or PC/TIE/EVOH/TIE/PC.

The preparation of the graft modified block copolymer is very readily done. Starting with a hydrogenated alkadiene vinyl aromatic block copolymer an unsaturated dicarboxylic acid or acid anhydride as typified by maleic anhydride is added to the copolymer, preferably with a free radical initiator of the peroxy type. The reaction occurs in the melt, for example, in an extruder.

Generally the quantity of the maleic anhydride, typifying the grafting agent, is from about 0.01 to about 5.0 weight percent of the block copolymer, preferably 0.1 to 1.0 weight percent.

The concentration of the radical initiator used to prepare the modified polymer may vary between wide limits and is determined by the desired degree of functionality and degradation allowable. Typical concentrations range from about 0.001 to about 5.0 weight percent, more preferably between about 0.01 and 1.0 weight percent.

Below are examples of the invention. These examples are intended to illustrate and not limit the scope of the inventive concept.

EXAMPLES

In these examples the graft block copolymer was a hydrogenated K-aton G1652 generally known as styrene ethylene butylene styrene (SEBS). The grafted group was maleic anhydride at 1.25 weight percent of the SEBS. The grafted hydrogenated block copolymer was prepared by extrusion of the unmodified hydrogenated copolymer with 0.05 phr dicumyl peroxide. It is referred to in the Table below as SEBSgMA. Also in the Table is polycarbonate (PC), LEXAN® 105, polybutylene terephthalate (PBT). VALOX® 315, polyphenylene oxide (PPO) and polyetherimide (PEI), ULTEM® 1000, all available from General Electric Company. Polyethylene terephthalate Tenite® 7352 (PET) is obtained from Eastman Kodak. Polypropylene 5520 is obtained from Shell (PP). PA6,is an amorphous polyamide prepared from isophthalic acid and hexamethylene diamine. The ethylene vinylalcohol employed has 32 mol percent ethylene and is obtained from Kuraray Co. as EVAL F®.

The films were prepared by pressing together the layers at 450–570° F. for a period of 15 seconds. The compatibility of the layers were tested by the standard 180° peel strength test performed on an Instron tensile tester at 2 in/min crosshead speed with multilayer strips 0.5 inches long. The greater the peel strength necessary to pull apart the layers, the greater is the compatibility of the layers.

TABLE I

| MULTILAYER COMPOSITE | PEEL STRENGTH LB/IN | TOTAL THICKNESS MILS |
|---|---|---|
| EVOH/SEBS/EVOH | 0 | 10–20 |
| PC/SEBS/EVOH | 0.5 | 10–20 |
| PC/SEBSgMA/EVOH | 6–12 | 10–20 |
| PBT/SEBSgMA/EVOH | 14 | 18 |
| PET/SEBSgMA/EVOH | >14 | 10 |
| PPO/SEBSgMA/EVOH | 14 | 9 |
| PP/SEBSgMA/EVOH | >17 | 23 |
| PEI/SEBSgMA/EVOH | 5 | 10 |
| PA6,I/SEBSgMA/EVOH | >10 | 20 |

As is observed from the data, ethylene vinyl alcohol is not bound to SEBS at all, it requires the graft maleic anhydride to make them compatible as shown by the greater pressure to pull them apart in the succeeding examples. Additionally, the succeeding examples demonstrate the compatibility of the SEBSgMA with a variety of polymers.

What is claimed is:

1. A multilayer composite which comprises a layer of an ethylene vinylalcohol polymer tied to a thermoplastic polymer with a hydrogenated alkadiene vinyl aromatic block copolymer which is graft modified with an unsaturated acid anhydride or unsaturated dicarboxylic acid thereof.

2. The composite in accordance with claim 1 wherein the thermoplastic polymer is selected from the group consisting of polyolefins, polyamides, polyacrylates, polyethers, polycarbonates, polyurethanes, polyvinylidiene chlorides, polyimides, polyetherimides, polysulfonates, polysulfones, polyethersulfones, polyarylethersulfones, polyarylates, polyesters, styrene resins, polyhydroxyether resins and polyarylene sulfide resins.

3. The composite in accordance with claim 2 wherein the thermoplastic polymer is polycarbonate, polyetherimide, or polyester.

4. The in accordance with claim 1 wherein the hydrogenated alkadiene block of the copolymer is derived from 1,3 butadiene or isoprene.

5. The composite in accordance with claim 1 wherein the vinyl aromatic is styrene, alphamethyl styrene, or paramethylstyrene.

6. The composite in accordance with claim 1 wherein the hydrogenated alkadiene vinyl aromatic block copolymer has a vinyl aromatic block at each end and a hydrogenated alkadiene block connecting the two vinyl aromatic blocks.

7. The of claim 1 wherein the grafting agent is a compound of the formula.

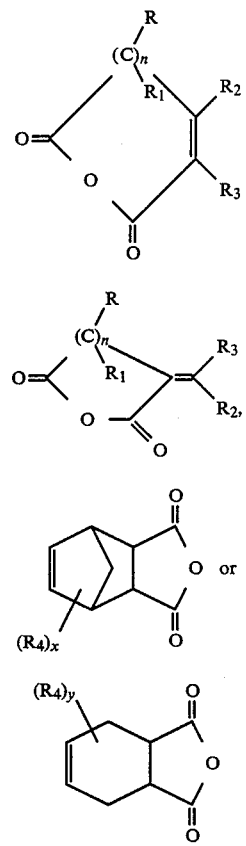

or the dicarboxylic acid analogues thereof
wherein R is the same or different as $R_1$ and is alkyl of one to six carbon atoms, inclusive, or hydrogen; n=0, 1 or 2

R$_2$ and R$_3$ are the same or different and are hydrogen, alkyl of one to six carbon atoms, inclusive, phenyl, chloro or bromo; and R$_4$=H, alkyl of one to six carboon atoms, aryl, alkyl, phenyl, Br, Cl, X'0 to 7, y=0 to 6.

8. The composite in accordance with claim 7 wherein the grafting agent is maleic anhydride or methyl maleic anhydride or itaconic anhydride.

9. The of claim 1 wherein the alkadiene is 1 butadiene, the vinyl aromatic is styrene, and the grafting agent is maleic anhydride.

10. The composite of claim 9 wherein the thermoplastic polymer is polycarbonate, polyester, or polyetherimide.

11. The composite in accordance with claim 10 wherein the multilayer composite is polycarbonate/styrene ethylene butylene styrene graft maleic anhydride/ethylene vinyl alcohol/styrene ethylene butylene styrene graft maleic anhydride/polypropylene.

* * * * *

UNITED STATES PATENT AND TRADEMARK OFFICE
CERTIFICATE OF CORRECTION

PATENT NO. : 4,869,963

DATED : September 26, 1989

INVENTOR(S) : Robert Russell Gallucci
Dana Craig Bookbinder

Page 1 of 2

It is certified that error appears in the above-identified patent and that said Letters Patent is hereby corrected as shown below:

Col. 6, Line 60
Delete "copolymer/polymer/ethylene" and add "copolymer/polypropylene"

Col. 7, Line 18
Delete "K-aton" and add "Kraton"

Col. 7, Line 31
Delete "PA6" and add "PA6,I"

Col. 8, Line 16
Add "composite" between "The" and "in"

Col. 8, Line 28
Add "composite" between "The" and "of"

Col. 9, Line 6
Delete "carboon" and add "carbon"

UNITED STATES PATENT AND TRADEMARK OFFICE
CERTIFICATE OF CORRECTION

PATENT NO. : 4,869,963

DATED : September 26, 1989

INVENTOR(S) : Robert Russell Gallucci, et al

It is certified that error appears in the above-identified patent and that said Letters Patent is hereby corrected as shown below:

Col. 9, Line 8
Delete "X'0" and add "X=0"

Col. 10, Line 1
Add "composite" between "The" and "of"

Col. 10, Line 1
Add ",3" after "1"

Signed and Sealed this

Twenty-fifth Day of September, 1990

Attest:

HARRY F. MANBECK, JR.

*Attesting Officer*  *Commissioner of Patents and Trademarks*